(12) United States Patent
Kosub et al.

(10) Patent No.: US 9,815,238 B2
(45) Date of Patent: Nov. 14, 2017

(54) BLOWN FILM WITH INTEGRAL PROFILES

(71) Applicant: Inteplast Group, Ltd., Livingston, NJ (US)

(72) Inventors: Roy Kosub, Seguin, TX (US); Alan Mosley, New Braunfels, TX (US); Garth Bielke, New Braunfels, TX (US); Jacob Arriaga, Seguin, TX (US); Jon Wagner, New Braunfels, TX (US)

(73) Assignee: Inteplast Group Corporation, Livingston, NJ (US)

( * ) Notice: Subject to any disclaimer, the term of this patent is extended or adjusted under 35 U.S.C. 154(b) by 346 days.

(21) Appl. No.: 14/788,274

(22) Filed: Jun. 30, 2015

(65) Prior Publication Data

US 2015/0375438 A1    Dec. 31, 2015

Related U.S. Application Data

(60) Provisional application No. 62/019,168, filed on Jun. 30, 2014.

(51) Int. Cl.
| | |
|---|---|
| *B29C 49/00* | (2006.01) |
| *B29C 47/88* | (2006.01) |
| *B29C 47/00* | (2006.01) |
| *B29L 7/00* | (2006.01) |

(52) U.S. Cl.
CPC ...... *B29C 47/8835* (2013.01); *B29C 47/0026* (2013.01); *B29C 47/883* (2013.01); *B29C 47/003* (2013.01); *B29C 47/0057* (2013.01); *B29K 2023/04* (2013.01); *B29L 2007/00* (2013.01)

(58) Field of Classification Search
None
See application file for complete search history.

(56) References Cited

U.S. PATENT DOCUMENTS

| | | |
|---|---|---|
| 3,320,340 A | 5/1967 | Luca |
| 3,340,116 A | 9/1967 | Naito |
| 3,597,795 A | 8/1971 | Naito |
| 3,875,281 A | 4/1975 | Behr |
| 4,003,972 A | 1/1977 | Herz |
| 4,115,048 A | 9/1978 | Alderfer et al. |
| 4,243,363 A | 1/1981 | Mulcahy |
| 4,443,400 A | 4/1984 | Herrington |

(Continued)

OTHER PUBLICATIONS

"Polyethylene Film Processing Guide: Quality, Value and Performance", Formosa Plastics Corporation; Jun. 2014, 7 pages.

*Primary Examiner* — Monica Huson
(74) *Attorney, Agent, or Firm* — Senniger Powers LLP

(57) ABSTRACT

A system and method for extruding film with a thickened profile section. In some embodiments, the film forms bags with integral zipper profiles. Plastic film is extruded to form a tube. During extrusion, cooling jets direct cooling gases toward the thickened profile section below the frost line to preferentially cool the thickened profile sections. In some embodiments, warm air is drawn out of the tube interior through hot air intakes located below the frost line. In certain embodiments, the film is extruded at a higher rate of speed than conventional processes. Likewise, the extruded film tube is expanded at a lower blow up ratio than conventional processes in certain preferred embodiments. In some embodiments, the extrusion system includes an air flow surface oriented relative to the film tube to define an air flow gap of substantially uniform thickness.

21 Claims, 4 Drawing Sheets

(56) References Cited

U.S. PATENT DOCUMENTS 5,676,893 A    10/1997   Cree
6,994,535 B2    2/2006   Pawloski
7,695,263 B2    4/2010   Fischer

BLOWN FILM WITH INTEGRAL PROFILES

REFERENCE TO RELATED APPLICATION

This application claims priority to U.S. provisional application 62/019,168 filed Jun. 30, 2014, the entire disclosure of which is expressly incorporated herein by reference.

FIELD

The present invention generally relates to blown films having integral profiles such as for bags and packaging.

BACKGROUND

Plastic bags having zippers and used for storing food and other items present unique manufacturing challenges because they have so-called "integral profiles" which are sections of the bag films which are thicker than other sections of the bag films. Zipper bags are generally manufactured by ether separately forming a bag body and zipper profile and appending the zipper profile to the bag body or forming the bag body and zipper profile together in one process. Extrusion is one method of forming a bag body and zipper profile in a single process. When a bag body and zipper profile are extruded together in the same process, the thicker sections that define the zipper profile cool more slowly than the thinner sections that define the bag body. The differential cooling rates impart stresses and can result in distortion of the profile shapes. Also, slower cooling rates can permit relaxation of shape which manifests itself as distortion. In order to maintain dimensional integrity of the thicker profile, slower cooling segments, as a general proposition it is necessary to use slow forming speeds so that the thicker profile sections are sufficiently hardened before the films are collapsed to minimize damage and distortion.

U.S. Pat. No. 3,875,281 describes generally some of the challenges in manufacturing blown films with integral profiles, such as distortion, closing of gaps, and manufacturing speed. The '281 patent proposes to address differential profile cooling challenges by establishing two control zones. Zone 1 is a region between the die head and the frost line and zone 2 is the region above the frost line. In zone 1, air is moved rapidly along the sides of the film to create a venturi effect to lower the atmospheric pressure. The arrangement requires a lower air ring 38 and shield 48, and in fact profiles were unsatisfactory in the absence of shield 48.

SUMMARY

Briefly, therefore, the invention is directed to an improved process and apparatus for manufacturing blown films having integral profiles such as zippers in plastic bag films which process and apparatus manifest high speed, simplicity, reliability, and integrity of profile dimensions.

In one aspect, a method for manufacturing a blown plastic film having integral profiles using an extruder comprises extruding a tube of polyethylene-based resin including at least two thickened profile sections extending continuously in the direction of extrusion along a surface of the tube. Each thickened profile section is preferentially cooled by directing a jet of cooling gas toward each thickened profile section. The extruded tube defines a bubble extending from an extrusion die head at a bottom of the bubble to a film collector at a top of the bubble.

In another aspect, an extrusion system comprises an extruder configured to extrude a plastic material in an extrusion direction. An extrusion die defines an extrusion passage having a least one thin segment and at least one thick segment. The extrusion die is operatively connected to the extruder to receive the plastic material therefrom such that the extruded plastic material passes through the extrusion passage. The extrusion passage is configured to shape the plastic material into a film tube having a thickened profile section aligned with the thick segment of the extrusion passage. A freezing control device is positioned relative to the extrusion die to be received in an interior of the film tube as the film tube is being extruded. The freezing control device comprise a cooling jet configured to deliver the cooling gas toward the thickened profile section of the film tube as the film tube is being extruded and thereby preferentially cool the thickened profile section.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
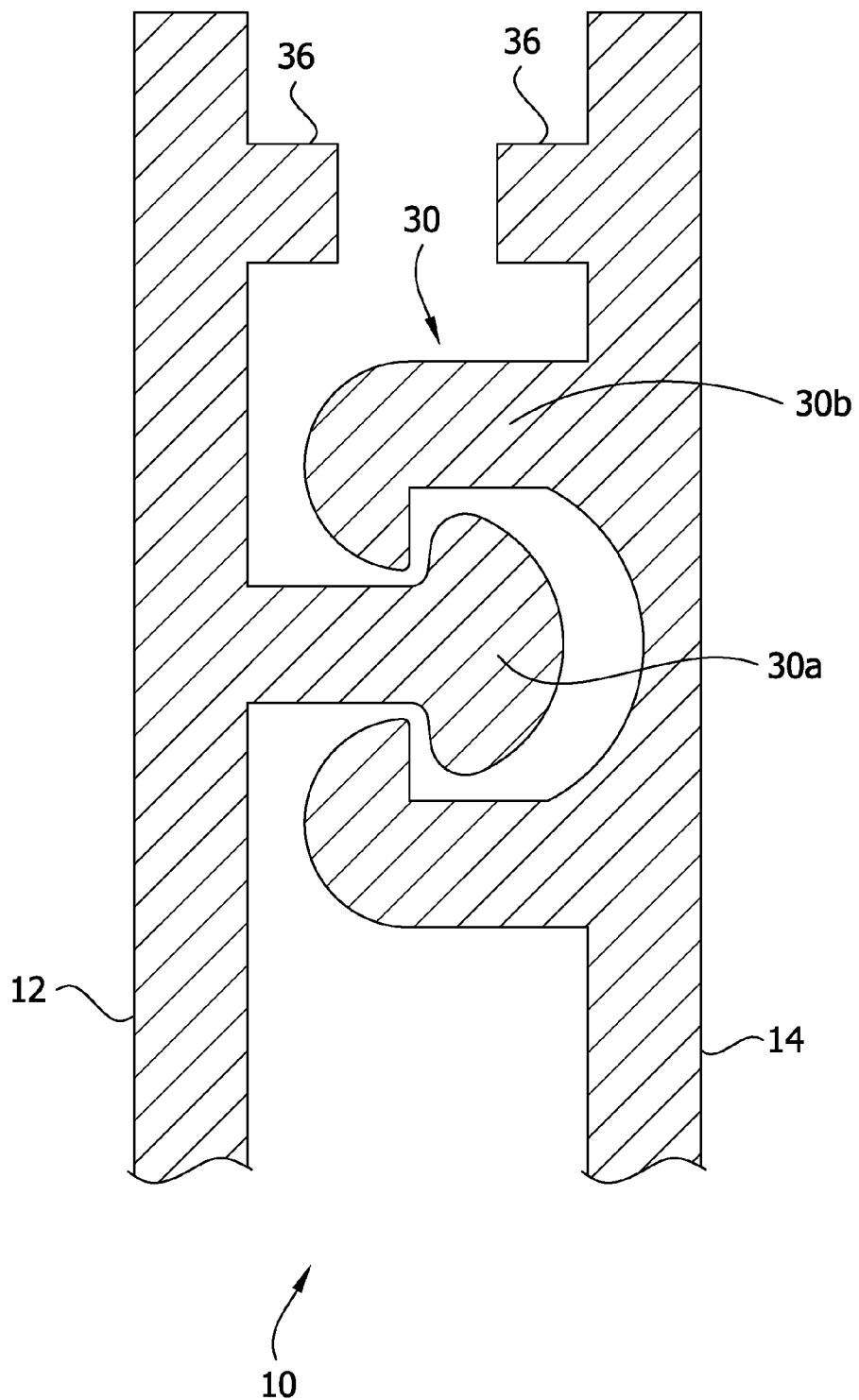
FIG. 1 is a fragmentary cross section of a zipper profile of a bag.

The present disclosure is directed to systems and methods for manufacturing a blown plastic film having integral profiles. Referring to FIG. 1, an example of such a film and associated product is a sealable plastic bag, generally indicated at reference number 10, such as for food storage, specimen storage, or other storage wherein the bag has a zipper. Other types of blown plastic film with thickened profile sections can also be manufactured with the systems and methods described below without departing from the scope of the invention. As will be appreciated, the systems and methods described herein enable the extrusion of a blown plastic film with one or more thickened profile sections at a relatively high extrusion speed and while maintaining the desired integrity of the shape of the thickened profile sections.

The bag 10, illustrated in FIG. 1, is an example of one blown plastic film structure having a plurality of thickened profile sections. The bag 10 includes two primary bag panels 12, 14 and a zipper 30 adapted to selectively close the bag 10. The interlocking components of the zipper 30 have a thicker profile than the film that constitutes the side walls 12, 14, of the bag 10. In the illustrated embodiment, the bag includes zipper components 30a, 30b and gripper ribs 36 which form thickened profile sections of the bag. It will be understood that other embodiments of a bag or other film will have thickened profile sections of other shapes without departing from the scope of the invention. As will be appreciated by one skilled in the art, the bag panels 12, 14 and thickened profile sections 30a, 30b, 36 can be extruded together such that the thickened profile sections extend continuously in the direction of extrusion along a surface of a tube, which is further processed to form the bag 10. The zipper components 30a and 30b and gripper ribs 36 in FIG. 1 are examples of such thickened profile sections, wherein the thickened profile sections are co-extruded with a tube that eventually forms panels 12, 14.

Figure 2:
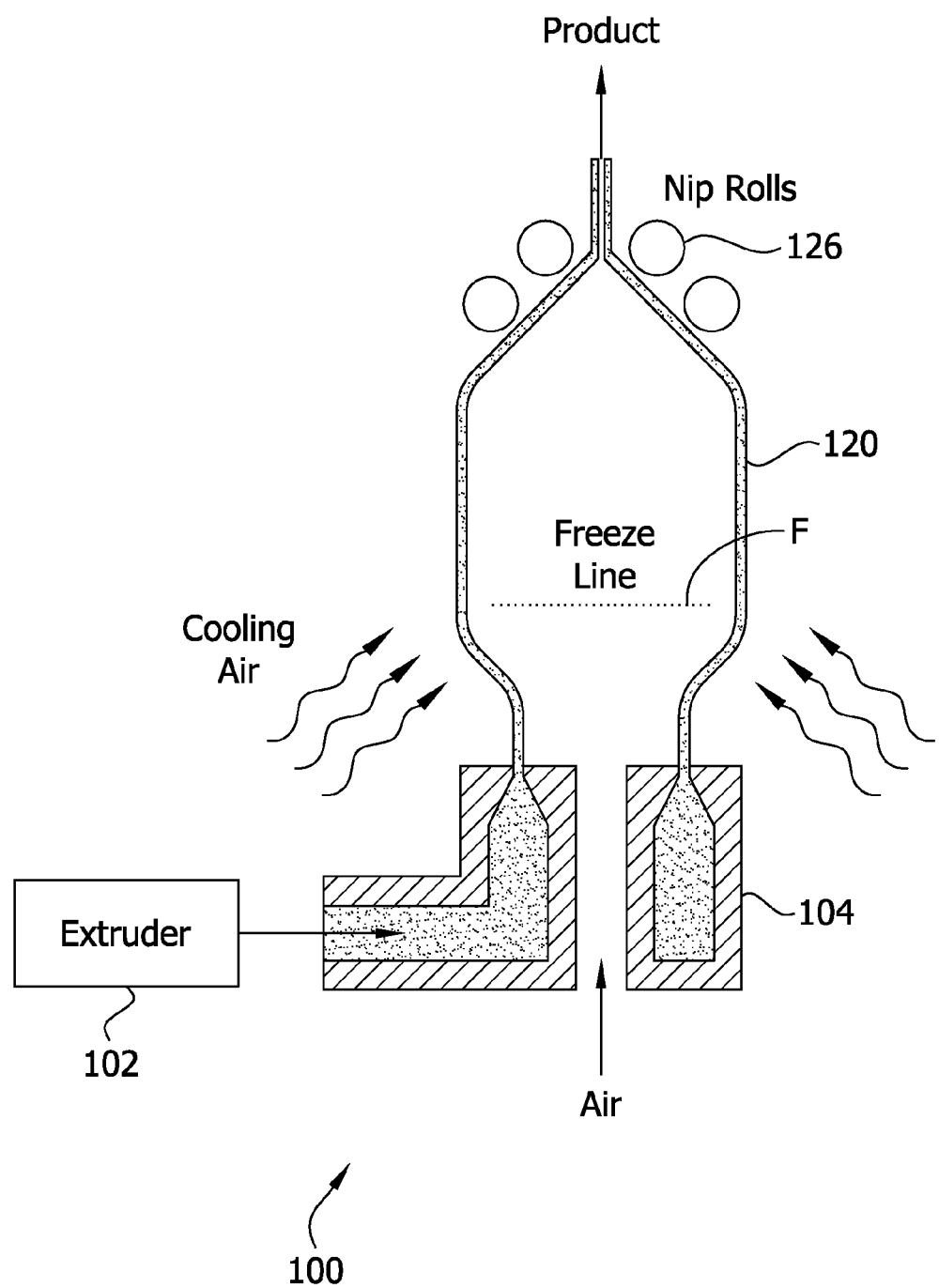
FIG. 2 is a schematic diagram of an extrusion system.
Figure 3:
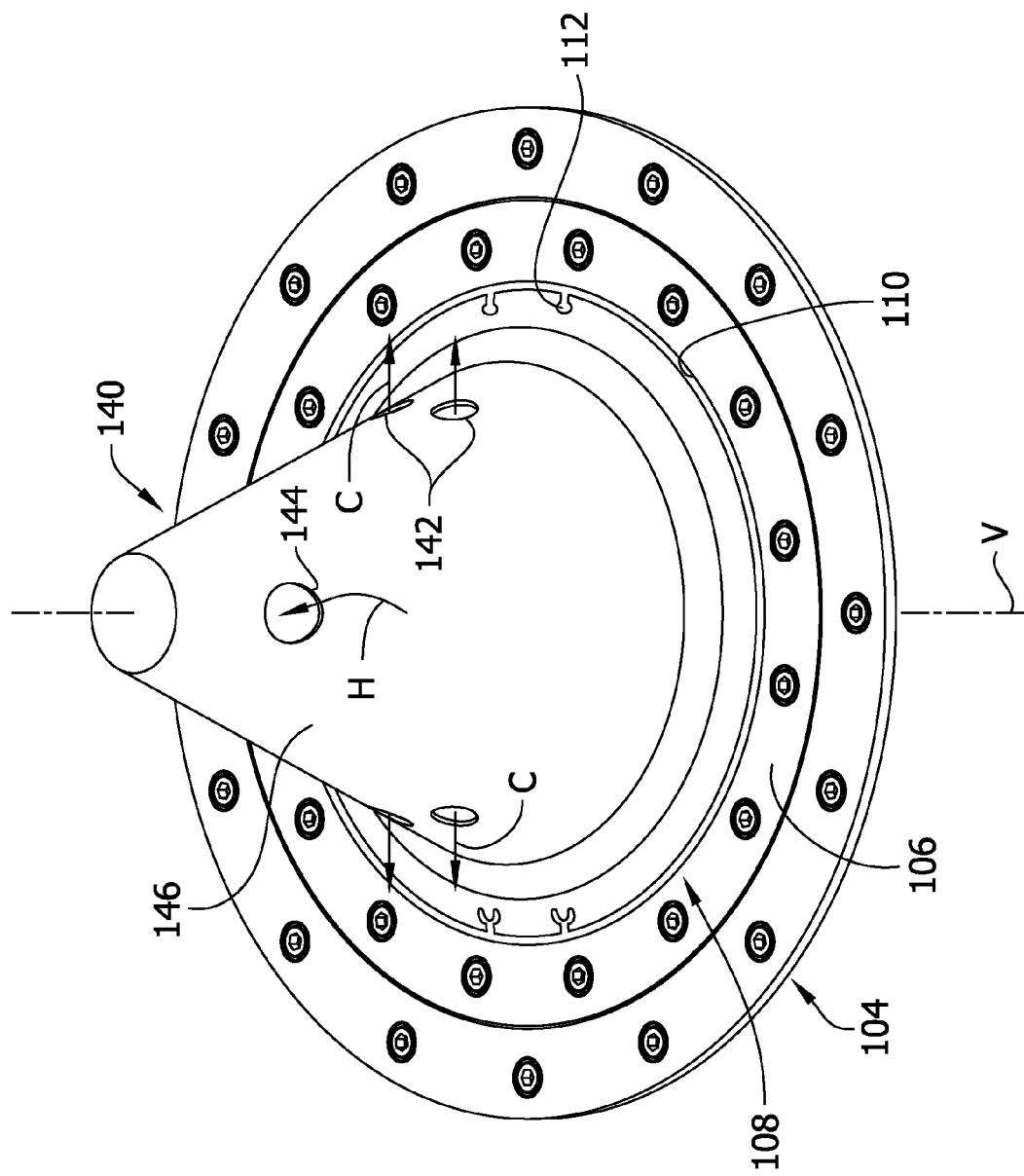
FIG. 3 is a perspective of a freezing control device for use with the extrusion system.

As a general proposition, the invention is performed using an extrusion system 100 as shown schematically in FIG. 2 which has an extruder 102 in which polymer is melted and pumped into a tubular die 104 through which it is extruded. In general the die 104 defines a die passage, which defines the cross-sectional shape of the film as it exits the die. As shown in FIG. 3, in some embodiments, the die 104 includes a die head 106, which defines the die passage 108. In general, dies 104 and die heads 106 should define an extrusion passage 108 with one or more thin segments 110 and one or more thick segments 112. In the embodiment illustrated in FIG. 3, the thin segments 110 are bag panel segments, which define the panels 12, 14 of a bag 10; the thick segments 112 are zipper segments and gripper rib segments, which define the zipper components 30*a*, 30*b* and gripper ribs 36, respectively.

Referring again to FIG. 2, the extruder 102 pumps molten plastic materials through the die 104 to form an extruded tube or bubble 120 of plastic film. Air is blown up the middle of the extruded tube. Typically, the tube 120 is expanded in both the lengthwise and radial direction up until a so-called "frost line" F at which point the plastic film solidifies such that it no longer expands. But in other embodiments, the tube 120 does not expand radially after exiting the extrusion die 104. For example, in some embodiments, the tube 120 narrows radially between the die 104 and frost line F. The height of the frost line F is measured as the distance from the die head 106 to the frost line. The change in radial dimension of the film tube 120 between the outlet of the die 104 and the frost line F is measured as a blow up ratio (BUR). The BUR is the ratio of the diameter of the tube 120 at the frost line F to the diameter of the die passage 108, and it manifests the amount of stretching the polymer is undergoing during the shaping of the film. In particular, the BUR is calculated as follows: BUR=(0.637×Lay-Flat Width)/die diameter. In this calculation, the "lay-flat width" is the width of the film when collapsed into its flat bag conformation. If an extrusion system 100 has a blow up ratio that is greater than one, the tube 120 expands radially as it extends from the die 104 to the frost line F. If the extrusion system 100 has a blow up ratio that is less than one, the tube 120 shrinks radially as it extends from the die 104 to the frost line F. In certain conventional blown film applications, it is desirable to use an especially low diameter die relative to the width of the ultimate bag so that there is significant expansion and stretching in the lateral direction during blowing of the film. But as discussed in further detail below, in certain embodiments, the film 120 is extruded at a much lower BUR than in those conventional applications.

There is a collector 126 above the frost line F for collecting the edges of the tube 120, which collector is here depicted as nip rolls. The tube 120 travels upward from the frost line F to the collector 126, which arranges the tubular film for subsequent processing. The illustrated collector 126 collapses the tube 120 such that the tube defines a bubble extending from the extrusion die head 106 at a bottom of the bubble to the film collector 126 at a top of the bubble.

In accordance with one embodiment of this invention, the die system 100 forms a film having one or more thickened profile sections (e.g., the bag 10, with thickened profile sections 30*a*, 30*b*, 36). Each thickened profile section is extruded through the thick segments 112 of the die passage 108. During extrusion, each thickened profile section is preferentially cooled by directing a jet of cooling gas toward each thickened profile section. Referring to FIG. 3, in an exemplary embodiment, the die system 100 includes a cooling cone 140 (broadly, a freezing control device) configured to direct cooling air toward the thickened profile sections of the film as indicated by the arrows labeled C. As discussed in further detail below, in certain embodiments, the cooling cone 140 is further configured to remove hot or warm air from inside the film bubble as indicated by the arrow labeled H. The cone 140 also has an outer air flow surface 146 that is shaped and arranged relative to the die 104 and the tube 120 to shape the profile of the air flowing between the cone and tube.

In one exemplary embodiment, the cooling cone 140 extends from a cooling cone base adjacent the extrusion die head 106 toward a cooling cone apex pointing in the direction of the collector 126. The cooling cone 140 has one or more jets operatively connected to four cooling gas outlets 142 through which the jets blow a cooling gas such as air toward the thickened profile sections of the film. In the illustrated embodiment, the cooling gas outlets 142 are oriented generally perpendicular to the air flow surface 146 and in line with the thick segments 112 of the extrusion passage 108. There is also in this embodiment at least one hot air intake 144 located in the side wall of the cooling cone 140 and operatively connected to a hot air remover such as a vacuum. The cooling cone 140 can include any number of hot air removers operatively connected to one, two, or more hot air intakes 144 arranged near the top of the cooling cone (e.g., above the cooling gas outlets 142) for collecting hot air and returning it to a heat exchanger for cooling or to simply exhaust it. It can be seen here that the at least one hot air intake 144 is located in the side wall of the cooling cone 140 at a location which is narrower than where the cooling gas openings 142 are.

In one embodiment, the air flow surface 146 of the cooling cone 140 flares outwardly from top to bottom at an angle of from about 15° to about 30° relative a vertical axis V. The cone 140 occupies space within the film tube 120 (not shown in FIG. 3) and thereby reduces the cross section in the bottom portion of the bubble. Since the cross section is reduced, the flow rate of the cooling gas jets over the thickened profile sections is advantageously increased to enhance the rate of cooling and heat removal. One effect of this cooling cone 140 is that it cools the thickened profile sections of the film but only has limited effect on the thinner portions of the film that may lower the frost line F. The cooling air focuses on the thickened profile sections but has restricted contact with the overall film so the height of frost line F can be raised. In one embodiment, for example, the frost line is at least about 13 inches above the extrusion die head 106, such as from about 13 to about 20 inches above the die head. With this higher frost line, a greater production speed is possible such as at least about 100 feet/minute, such as at least about 110 feet per minute, or at least about 120 feet per minute (e.g., from about 120 to about 135 feet per minute).

In one or more preferred embodiments, the air flow surface 146 of the cooling cone 140 is oriented generally parallel to a portion of the film tube 120 located below the frost line F. As discussed above, the air flow surface 146 narrows as it extends upward. Thus, in certain embodiments, the film tube 120 narrows as it extends from the die head 106 toward the frost line F (e.g., the tube has a BUR of less than one). In these embodiments, the wall of the film tube 120 is oriented at about the same angle relative to the vertical axis V as the air flow surface. The tube 120 and cooling cone 140 define a conical gap of substantially uniform thickness. Cool air flows from the cooling jets 142 toward the thickened profile sections of the film and then flows through the air flow gap, up along the air flow surface 146, and into the hot air intake 144. The uniform thickness of the gap between the air flow surface 146 and the film tends to reduce turbulence in the gap and thereby promotes uniform cooling of the film as it is extruded. Although the illustrated embodiment uses a cooling cone 140 that narrows as it extends upward, it will be understood that in other embodiments freezing control devices can include air flow surfaces of different shapes without departing from the scope of the invention. For example, in some embodiments it is contemplated that the air flow surface may widen as it extends upward to define a uniform air flow gap with a tube having a BUR of greater than 1.

Although in some embodiments, the freezing control device 150 is a cooling cone, in other embodiments, the freezing control device 150 can have other configurations without departing from the scope of the invention. For example, in one embodiment illustrated in FIG. 4, the freezing control device 150 includes a plurality of radially oriented cooling nozzles 151 configured and arranged to direct cool air toward thickened portions of an extruded film tube 120. Likewise, the freezing control device 150 includes a plurality of hot air intakes 152 configured and arranged to remove hot air from the interior of the film tube 120 as it is extruded.

Figure 4:
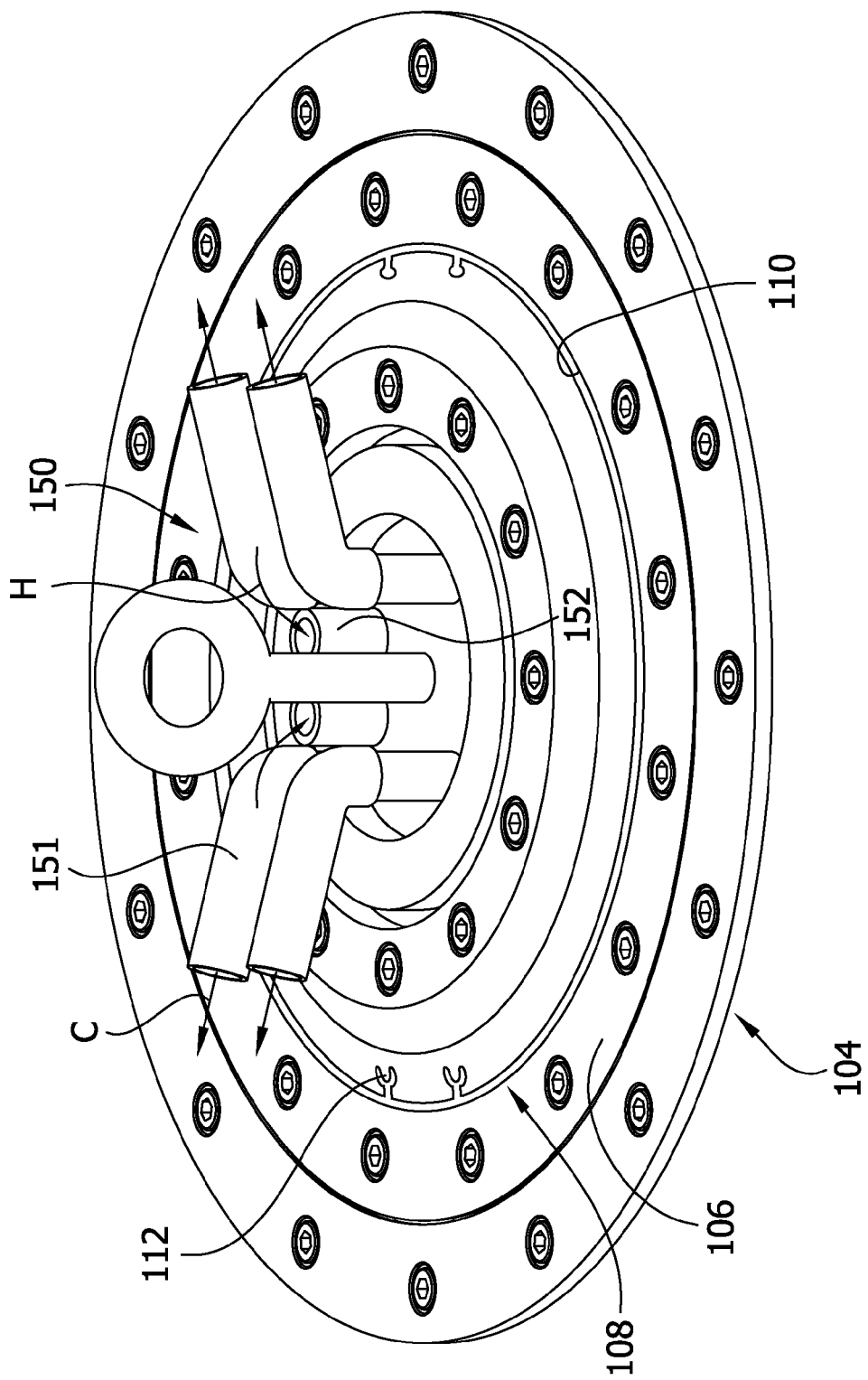
FIG. 4 is a perspective of another embodiment of a freezing control device for use with the extrusion system.

In the embodiments depicted here in FIGS. 3 and 4 and other suitable embodiments of freezing control devices, the outlets 142 for the cooling gas jets are all located in a common horizontal plane, and there is a separate outlet assigned to each thickened profile section. There are no cooling jets other than the ones on this common horizontal plan. This cooling rapidly freezes the thicker profile features such as zippers and freezes them substantially independently from the thinner film sections so the thicker profile sections do not lose the shape imparted by the die or deform in bubble collapsing.

The material used to manufacture the films of the invention is, in one or more preferred embodiments, conventional polyethylene-based material selected from among low density polyethylene (LDPE), linear low density polyethylene (LLDPE), metallocene linear low density polyethylene (m-LLDPE), and blends thereof. For example, one embodiment uses a blend of about 70-75 wt % LDPE, about 15-25 wt % LLDPE, and about 5-10 wt % m-LLDPE. The compositions of the layers are described herein as containing various components by weight %. However, those skilled in the art understand that in a layer of the ultimate film, the specific compounds may not be separately identifiable or even necessarily separately present. Nonetheless, it is conventional in the art to refer to the final composition as containing a given % of the individual components that go into forming the film; so that is done here. From this perspective, the compositions herein are on an equivalent basis.

In general, systems and methods of film extrusion according to the present invention form film tubes 120 having relatively low BUR. In one embodiment of the invention the process employs a BUR in the range of about 2 to 3, which corresponds to modest stretching. This is a lower BUR than one would typically use with HMW-HDPE blown films. In an alternative embodiment of the invention, parameters are used which manifest a BUR of less than 2, such as less than or equal to 1. Applicants have discovered that using a lower BUR such as this enhances dimensional stability of the thicker profile sections because the overall film is not stretched as much laterally after exiting the die as compared to higher BUR processes.

A natural consequence of this lower BUR, however, is a detrimental effect on impact strength as the lower BUR film is primarily oriented in the machine direction (MD) and less oriented in the transverse direction (TD) in comparison to higher BUR films. But this natural consequence is addressed and avoided in the present invention by intentionally raising the frost line F by reducing the external cooling. Reducing the external cooling can be achieved by, for example, using less cool air or a lower flow rate. A reduction in external cooling raises the frost line F so the film has more time to cool so that the MD and TD orientation in the cooled film is more balanced. That is, a blown film with X seconds to cool will have greater MD orientation and less MD/TD orientation balance than a blown film with X+Y seconds to cool. Stated another way, a blown film using a die-to-frost line height of e.g. 10 inches will have greater MD orientation and less MD/TD orientation balance than a blown film with a die-to-frost line height of 15 inches. Because the bulk film here with the raised frost line F has more time to cool, the bulk film has a good balance of MD and TD orientation. So a higher BUR is not required to impart adequate impact strength. And a lower BUR can be used to enhance dimensional stability of thicker profile sections.

While the higher frost line F has a positive effect on MD/TD orientation balance, it has a potentially negative effect on dimensional stability of thicker profile sections. In particular, these profile sections would have more time in their molten condition before solidifying, which risks relaxation and distortion. However, this risk is eliminated or at least minimized in the present invention by the preferential cooling operation described above which rapidly freeze the thicker profile features such as zippers and freezes them independently from the film so the thicker profile sections do not lose the shape imparted by the die or deform in bubble collapsing.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method for manufacturing a blown plastic film having integral profiles using an extruder, the method comprising:
    extruding a tube of polyethylene-based resin including at least two thickened profile sections extending continuously in the direction of extrusion along a surface of the tube; and
    cooling each thickened profile section by directing a jet of cooling gas toward each thickened profile section;
    wherein the extruded tube defines a bubble extending from an extrusion die head at a bottom of the bubble to a film collector at a top of the bubble.

2. The method of claim 1 wherein the step of extruding the tube comprises extruding the tube to have a blow up ratio of less than 3.

3. The method of claim 1 wherein the step of extruding the tube comprises extruding the tube to have a blow up ratio of less than 2.

4. The method of claim 1 wherein the step of extruding the tube comprises extruding the tube to have a blow up ratio of less than 1.

5. The method of claim 1 wherein the step of cooling comprises directing the jets of cooling gas to impact the thickened profile sections at a point below a frost line of the bubble.

6. The method of claim 1 wherein the cooling is performed by a cooling cone which comprises cooling jets for directing the jet of cooling gas toward each thickened profile section.

7. The method of claim 6 wherein the cooling jets are located in a common horizontal plane.

8. The method of claim 6 wherein the cooling cone side walls flare outwardly from top to bottom at an angle between about 15° and about 30°.

9. The method of claim 1 further comprising removing hot air from an interior of the bubble through at least one hot air intake.

10. The method of claim 9 wherein the at least one hot air intake and the cooling jets are located in a side wall of a cooling cone, the hot air intake being located at a narrower location of the cooling cone than the jets.

11. The method of claim 9 wherein the at least one hot air intake is located below the frost line.

12. The method of claim 1 wherein the frost line is at least about 13 inches above the extrusion die head.

13. The method of claim 1 wherein the extrusion speed is at least about 100 feet/minute.

14. The method of claim 1 wherein the step of cooling comprises directing a jet of cooling gas out of radially oriented cooling nozzles toward each thickened profile section.

15. An extrusion system comprising:
an extruder configured to extrude a plastic material in an extrusion direction;
an extrusion die defining an extrusion passage having a least one thin segment and at least one thick segment, the extrusion die being operatively connected to the extruder to receive the plastic material therefrom such that the extruded plastic material passes through the extrusion passage, the extrusion passage being configured to shape the plastic material into a film tube having a thickened profile section aligned with the thick segment of the extrusion passage; and
a freezing control device positioned relative to the extrusion die to be received in an interior of the film tube as the film tube is being extruded, the freezing control device comprising a cooling jet configured to deliver the cooling gas toward the thickened profile section of the film tube as the film tube is being extruded and thereby preferentially cool the thickened profile section.

16. The extrusion system of claim 15 wherein the freezing control device further comprises an air flow surface shaped and arranged to be oriented substantially parallel to the film tube as the film tube is being extruded to define an air flow gap between the air flow surface and the film tube of substantially uniform thickness.

17. The extrusion system of claim 16 wherein the cooling jet is arranged to discharge cooling gas in a direction oriented substantially perpendicular to the film tube.

18. The extrusion system of claim 16 wherein the freezing control device further comprises a hot air intake configured to remove hot air from the air flow gap.

19. The extrusion system of claim 16 wherein the air flow surface is substantially conical.

20. The extrusion system of claim 16 wherein the air flow surface flares outwardly from top to bottom.

21. The method of claim 1 wherein the polyethylene-based resin comprises a material selected from the group consisting of low density polyethylene (LDPE), linear low density polyethylene (LLDPE), metallocene linear low density polyethylene (m-LLDPE), and blends thereof.

* * * * *